United States Patent [19]

Schiller et al.

[11] Patent Number: 4,969,156
[45] Date of Patent: Nov. 6, 1990

[54] LASER CAVITY HAVING AN ADJUSTABLE OPTICAL PATH LENGTH EXTENDER

[76] Inventors: Norman H. Schiller, 163-16 Willets Pt., Whitestone, N.Y. 11357; Robert R. Alfano, 3777 Independence Ave., Bronx, N.Y. 10463

[21] Appl. No.: 87,777

[22] Filed: Aug. 21, 1987

[51] Int. Cl.$^5$ .............................................. H01S 3/081
[52] U.S. Cl. ........................................ 372/93; 372/92; 372/94; 372/99; 372/101
[58] Field of Search .......................... 372/9, 25, 92–95, 372/99, 101

[56] References Cited

U.S. PATENT DOCUMENTS

| | | | |
|---|---|---|---|
| 3,414,839 | 12/1968 | Bridges et al. | 372/101 |
| 3,457,415 | 7/1969 | Lipsett et al. | 372/32 |
| 3,488,606 | 1/1970 | Rigrod | 372/94 |
| 3,575,667 | 4/1971 | Smith | 372/94 |
| 4,400,814 | 8/1983 | Fork et al. | 372/18 |
| 4,606,031 | 8/1986 | Beene et al. | 372/70 |
| 4,617,665 | 10/1986 | Mouron et al. | 372/18 |
| 4,740,986 | 4/1988 | Reeder | 372/93 |
| 4,833,683 | 5/1989 | Ury et al. | 372/75 |

OTHER PUBLICATIONS

White; "Long Optical Paths of Large Aperture"; Journal of the Optical Society of America; May 1942; pp. 285–288.

Primary Examiner—William L. Sikes
Assistant Examiner—Georgia Y. Epps
Attorney, Agent, or Firm—Irving M. Kriegsman

[57] ABSTRACT

A laser is disclosed which includes an optical path length extender for increasing the optical path length of the laser cavity. The path length extender, which is disposed inside the laser cavity itself, includes a set of three curved mirrors each having the same curvature. The three mirrors are spaced and angularly positioned such that light entering the path length extender is reflected back and forth about the three mirrors a defined number of times before exiting the path length extender. By rotating one or two of the mirrors the number of reflections within the set of mirrors can be changed. The laser cavity configuration is particularly useful in a pulse laser for increasing the optical path length of the cavity for the purpose of increasing the pulse to pulse separation of the emitted pulses, when such an increase is desired, but is not limited exclusively to pulse lasers.

9 Claims, 1 Drawing Sheet

LASER CAVITY HAVING AN ADJUSTABLE OPTICAL PATH LENGTH EXTENDER

BACKGROUND OF THE INVENTION

The present invention relates generally to lasers and more particularly to laser cavities.

Over the last twenty years the use of lasers in science, health care and industry has received wide acceptance in an ever increasing variety of applications. Lasers have found use in such diverse areas as range finding apparatus, optical surgery, optical printers, optical readers and metal drilling. As is known, lasers operate on the principle of light amplification through stimulated emission of radiation and can create extremely intense concentrations of light. Briefly, a laser includes a laser material, sometimes referred to as an active element, a mechanism for pumping the laser material and an optical resonant cavity, sometimes referred to simply as a laser cavity. The laser material is disposed in the laser cavity and is pumped by the pumping mechanism to emit light. Light emitted by the laser material is reflected back and forth within the cavity from one end to the other, with a portion of the light being transmitted out of the cavity for subsequent use.

Materials which are used as laser materials include gases, liquids, glasses and single crystalline solids. The mechanism which is employed for pumping the laser material is either electrical or optical, the particular mechanism used depending on the particular laser material. The laser cavity usually comprises a pair of end mirrors which are spaced from one another at an appropriate distance and angularly arranged to define a closed loop optically resonant cavity. The end mirrors may both be flat, one may be curved or both may be curved. At least one of the end mirrors is made partially transmissive to allow a portion of the radiation emitted from the laser material and reflected back and forth between the end mirrors to leave the cavity.

In some lasers the output is in the form of a continuous wave while in other lasers the output is in the form of a train of pulses. Generally, the distance that light travels in the optical cavity when going from one end mirror to the other end mirror through the laser material is called the optical path length of the cavity. The time it takes for light traveling inside the cavity to go from one end mirror to the other end mirror and then back to the first end mirror, is commonly referred to as the "round trip cavity time." In a pulse laser, the spacing between the individual pulses in the chain of pulses that are emitted by the laser is dependent on the optical path length of the cavity and, correspondingly, the round trip cavity time. The larger the optical path length, the greater the separation between pulses. During the past ten years, ultrafast (i.e. picosecond) pulses have been generated in the visible and infrared spectral regions by passive and active mode-locked ruby, neodymium and dye laser and other types of laser systems.

Examples of some types of lasers may be found in U.S. Pat. No. 4,464,741 to R. Alfano et al, U.S. Pat. No. 4,272,733 to J. C. Walling etc., U.S. Pat. No. 3,997,853 to R. C. Morris, and U.S. Pat. No. 3,508,166 to W. W. Simmons et al.

One laser that has proven to be the workhorse for investigating picosecond and nonlinear optical phenomena is the solid state laser. An example of a solid state laser is the mode-locked neodymium glass laser. The output of a conventional mode-locked solid state laser consists of a train of approximately 100 pulses emitted over a time period of about 500 nanoseconds (ns) with each pulse separated by about 5 to 10 ns. The pulse widths are on the order of 6 to 10 picoseconds (ps) with a peak power of 2 to 5 GW. The optical path length of the laser cavity in such a laser usually ranges from approximately 1 to 2 meters, due to limited space and mechanical stability.

In a number of situations, such as ranging and remote sensing, it has been desirable if not essential to be able to have a pulse to pulse spacing that is much larger than the spacing that is actually produced by the laser itself.

One way that has been used in the past to increase the space between pulses has involved increasing the spacing between the end mirrors which make up the laser cavity i.e. moving one end mirror further away from the other. As can be appreciated, increasing the geometric distance between the cavity end mirrors does increase the optical path length of the cavity and will result in an increase in the spacing between the output pulses; however, this involves physically moving one or both end mirrors and results in actually reconstructing the entire cavity. Furthermore, the amount by which the two end mirrors must be spaced from one another to provide a particular pulse to pulse spacing is in some cases just not practical.

Another way that has been employed in the past to increase the pulse to pulse spacing of the pulses emitted from a pulse laser has involved not making any changes in the laser itself, but rather blocking out certain pulses in the output chain produced by the laser and not blocking out other pulses. For example, three out of every four pulses in the train may be blocked out and the fourth pulse allowed to pass. This has been achieved using either a chopper, an acousto-optical modulator, an electro-optical shutter or other type of similarly functioning device, with the device being located outside of the cavity. The problems with this approach are that it is rather complicated, not very practical and not entirely satisfactory in all situations.

As can be appreciated, the need exists for a new and improved technique for simply, effectively and efficiently increasing the optical path length of a laser cavity.

SUMMARY OF THE INVENTION

Accordingly, it is an object of this invention to provide a new and improved laser.

It is another object of this invention to provide a laser cavity having an optical path length which can be selectively increased.

It is still another object of this invention to provide a laser in which the optical path length of the laser cavity can be increased without having to move either one of the end mirrors.

It is yet still another object of this invention to provide a pulse laser in which the pulse to pulse spacing of the output train of pulses can be increased without appreciably changing the geometric (as opposed to optical) spacing between the end mirrors (i.e. without changing the geometric length of the cavity).

It is still a further object of this invention to provide a laser cavity having a long optical path length and a relatively short geometrical length.

It is a further object of this invention to provide a pulse laser in which the pulse to pulse separation in the train of output pulses can be increased without using devices external to the laser cavity.

According to the teachings of the present invention there is provided a laser in which an optical path extender is interposed inside the laser cavity. The optical path extender, which is located along the optical path of the cavity is made up of three curved mirrors sized, spaced and angularly positioned in a way so as to effectively increase the optical path length of the cavity. By rotating one of the mirrors in the optical path extender, the amount by which the optical path length is increased can be selectively varied.

The invention will hereinafter be described by way of example for use in connection with a neodymium glass laser; however it is to be understood that the invention is not exclusively limited to this type of laser but rather is applicable for use with other types of lasers, including especially copper vapor lasers.

Various features and objects will appear from the description to follow. In the description, reference is made to the accompanying drawing which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERRED EMBODIMENTS

Figure 1:
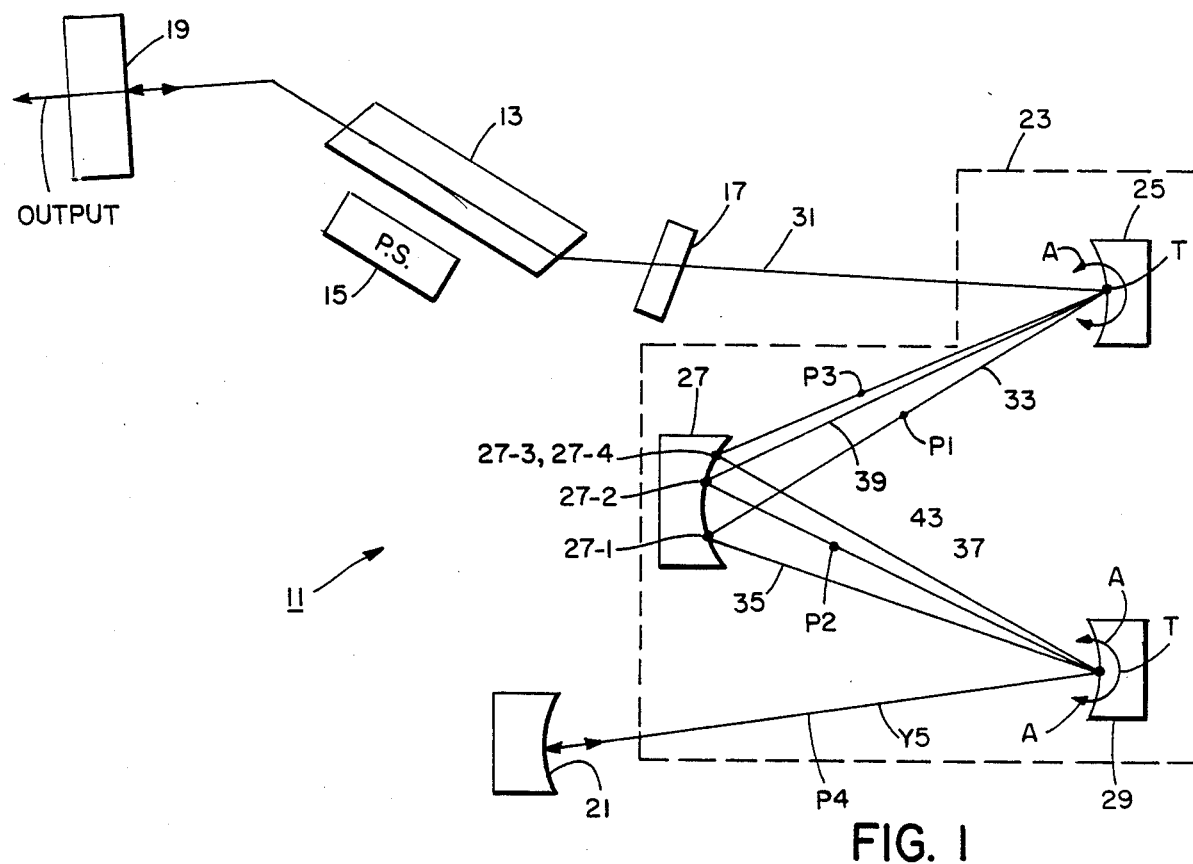
FIG. 1 is a schematic diagram of one embodiment of a laser constructed using the optical of path extender of the present invention.

Referring now to FIG. 1 there is illustrated a laser constructed according to the teachings of the present invention and identified by reference numeral 11.

Laser 11 includes an active laser element 13, which may by way of example be a solid medium such as neodymium doped silicate glass with the ends cut at Brewster's angle and a pumping source 15 for pumping laser element 13 which in the case of a solid type laser material may be a xenon flash lamp. Laser 11 may also include a dye cell 17 containing a saturable absorber for mode locking purposes and which in the case of the neodymium doped silicate glass laser material may be Kodak number 9860 dye dissolved in 1-2, Dichloroethane with transmission set at 70%. Laser element 13 along with dye cell 17 and pumping source 15 are disposed in an optical resonant (laser) cavity.

The laser cavity includes a front end mirror 19 and a rear end mirror 21. An optical path extender 23 is disposed within the laser cavity between dye cell 17 and back end mirror 21 and serves to selectively increase the optical path length of light passing from one end of the cavity to the other without disturbing the cavity stability, as will hereinafter be explained.

Front end mirror 19 is partially (i.e. about 20 to 50%) transmissive and rear end mirror 21 is fully (i.e. 100%) reflecting. Alternatively, front end mirror 19 may be made fully reflective and rear end mirror 21 made partially transmissive or both end mirrors 19 and 21 may be made partially reflective. Front end mirror 19 is flat and rear end mirror 21 is curved. Alternately mirror 19 may be made curved and mirror 21 made flat. Front end mirror 19 and rear end mirror 21 are both fixed (i.e. not movable relative to each other).

Optical path extender 23 includes three curved mirrors 25, 27, and 29 disposed in succession between dye cell 17 and rear end mirror 21. Each mirror 25, 27 and 29 has the same radius of curvature RC. Mirror 25 is disposed to pass light between dye cell 17 and mirror 27. Mirror 27 is disposed to pass light between mirror 25 and mirror 29. Mirror 29 is disposed to pass light between mirror 27 and mirror 21. The distance between first mirror 25 and second mirror 27 is equal to the radius of curvature RC and the distance between second mirror 27 and third mirror 29 is also equal to the radius of curvature RC. For example, if the radius of curvature RC of each one of mirrors 25, 27 and 29 is one meter, then the distance from mirror 25 to mirror 27 and the distance from mirror 27 to mirror 29 are each one meter. The distance between third mirror 29 and rear end mirror 21 is equal to the sum of the radius of curvatures of mirrors 21 and 29. Mirrors 25 and 29 are each adjustably mounted by any suitable means not shown for rotation about their respective center points T as shown by arrows A. Mirror 27, on the other hand, is fixedly mounted.

End mirrors 19 and 21 are spaced from one another such as to form an optically resonant cavity.

In the operation of laser 11, light emitted from active element 13 and reflected from mirror 21 passes through laser element 13 and dye cell 17 and enters optical path extender 23. In optical path extender 23, the light is reflected in succession off the three mirrors 25, 27 and 29 one or more times and then finally exits from mirror 21, the number of times the beam is reflected back and forth about the three mirrors 25, 27 and 29 being adjustable and depending on the particular angular position of each one of mirrors 25 and 29. The number of times is increased or decreased by rotating either mirror 25 or mirror 29 or both mirrors 25 and mirror 29 an appropriate amount.

More specifically, when mirrors 25 and 29 are in one angular position light entering extender 23 from dye cell 17 will be reflected in succession of mirrors 25, 27 and 29 and then leave in the direction of mirror 21. However, by angularly adjusting mirrors 25 and/or 29, the light on reaching mirror 29 will not exit toward mirror 21 but rather will be reflected back to mirror 27 and then to mirror 25 and then pass down again to mirror 27 and then mirror 29 and so forth a certain number of times.

If only mirror 25 is adjusted then the outgoing beam toward mirror 19 will be disturbed. If only mirror 29 is adjusted then the outgoing beam to mirror 21 will be disturbed. If both mirrors 25 and 29 are adjusted then neither beam will be disturbed.

The way in which light passes through beam path extender 23 will be better understood with reference to the following specific example as shown and hereinafter described in more detail.

Assume mirrors 25 and 29 are angularly positioned so that light will strike mirror 27 six times in the course of traveling from mirror 19 to mirror 21 and then back to mirror 19, three times when traveling down from mirror 19 to mirror 21 and then three more times when traveling up to mirror 19.

Light from dye cell 17 enters beam path extender as a collimated beam along path 31 and strikes mirror 25. The beam reflected from mirror 25 travels along path 33 and comes to focus at point P1, continues on and strikes mirror 27 at point 27-1 as a diverging beam. The beam reflected off mirror 27, which is now collimated, travels along path 35 and strikes mirror 29. From mirror 29 the light travels back along path 37, comes to focus at point P2 and then strikes mirror 27 (for the second time) at location 27-2, as a diverging beam. From mirror 27, the light travels along path 39 as a collimated beam and strikes mirror 25. From mirror 25, the beam travels along path 41 and comes to focus at point P3 and strikes mirror 27, for the third time, as a diverging beam at point 27-3. From mirror 27, the beam, which is now collimated travels along path 43 to mirror 29. From mirror 29 the beam travels along path 45, comes to focus at point P4 and then strikes mirror 21 as a diverging beam.

As should be noted, each time the beam strikes mirror 27 when traveling in each direction, it is at a different location i.e. three different locations when going one way and the same three locations when going the other way. By observing the number of light spots on mirror 27, the number of times the light hits mirror 27 can be easily accertained.

From mirror 21, the beam works its way back through beam path extender following the same path but in the reverse order and then exits from mirror 25 as a collimated beam in the direction of dye cell 17 along path 31.

As can be appreciated, the optical path length of the laser cavity with mirrors 25 and 29 angularly oriented so that light hits mirror 27 three times when going from mirror 19 to mirror 21 and then three times when going back comprises the distance from mirror 19 to mirror 25 through laser element 13 and dye cell 17, plus the distance from mirror 25 to point 27-1 on mirror 27, plus the distance from point 27-1 to mirror 29, plus the distance from mirror 29 to point 27-2 on mirror 27, plus the distance from point 27-2 to mirror 25, plus the distance from mirror 25 to point 27-3 on mirror 27, plus the distance from point 27-3 to mirror 29, plus the distance from mirror 29 to mirror 21. The round trip cavity time is twice the time it takes to travel the optical path length of the cavity. Without optical path extender 23 the optical path length of the cavity would simply be the distance from mirror 19 to mirror 21 through laser element 13 and dye cell 17.

As can be appreciated, if the light is to pass from mirror 19, through beam path extender 23 to mirror 21 and then travel back through beam path extender 23 to mirror 19 it must hit mirror 27 an odd number of times (i.e. 1, 3, 5, 7 etc.) when going in the forward direction (to mirror 21) and, of course, the same number of times when going back to mirror 19.

In a system actually constructed using the FIG. 1 embodiment, the overall geometric length of the cavity was under 1.65 meters. Mirrors 25, 27 and 29 each had a radius of curvature of one meter. Mirrors 21, 25, 27 and 29 were all coated for 100% reflection at 1.06 $\mu$m. Mirror 19 was coated for 65% reflectivity. Laser element 13 was a Brewster angle cut neodymium doped silicate glass rod. Dye cell 17 was filled with Kodak No. 9860 dye dissolved in 1,2-Dichloroethane with transmission set at 70%. The distance from mirror 19 to mirror 25 was set at 1.5 meters, the distance from mirror 25 to mirror 27 and mirror 27 to mirror 29 was each set at 1 meter and the distance from mirror 29 to mirror 21 was set at 1.6 meters. By angularly rotating mirror 29 the necessary amount, the optical path length of the cavity was changed (i.e. increased) in 4 meter steps corresponding to about 13 nanosecond (change in pulse spacing) per step. The minimum path length was measured to be about 5.25 meters and the maximum path length about 21.25 meters. The stepped optical lengths of the cavity were measured at 5.25, 9.25, 13.25, 17.25 and 21.25 meters, respectively. The pulse to pulse spacing for the steps noted above was found to be 34, 61, 87, 115 and 140 nanoseconds, respectively. The number of times a pulse hit mirror 27 when traveling through path length expander between mirror 19 and mirror 21 in either the forward or the rearward direction was one, three, five, seven and nine, respectively. The number of times was determined by visually observing the number of spots on mirror 27 since each hit when going in either direction was at a different spot. As can be seen, the cavity configuration is capable of producing >2GW, <10 picosecond pulses with pulse to pulse separations of greater than 140 nanoseconds in steps of about 13-2 nanoseconds by adjusting only mirror 29.

Figure 2:
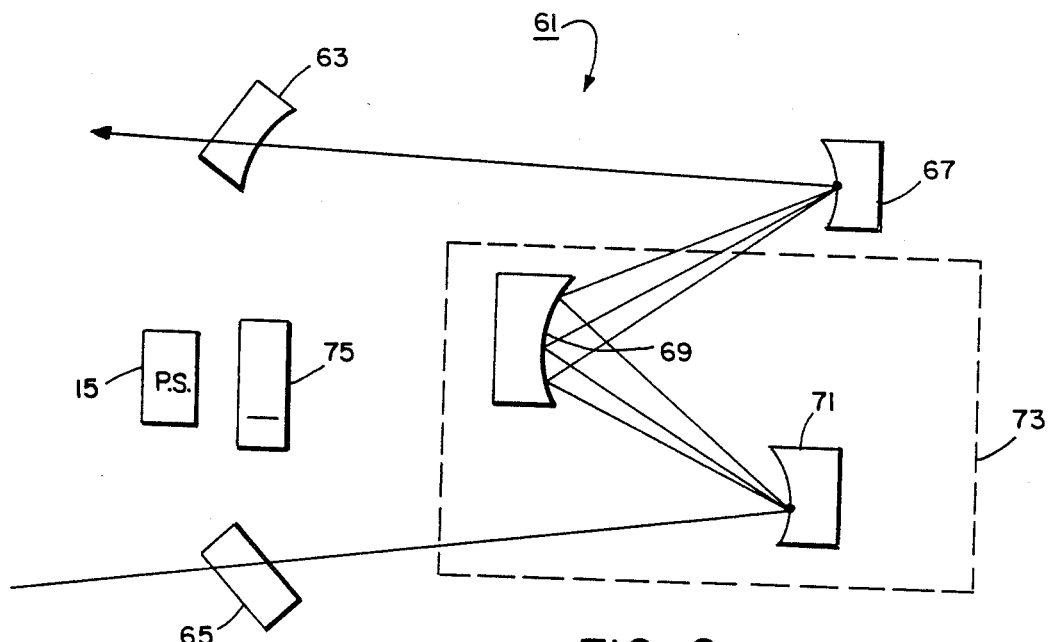
FIG. 2 is a schematic diagram of another embodiment of a laser constructed using the optical path extender of the present invention.

Referring now to FIG. 2 there is shown another embodiment of a laser constructed using the beam path extender of the present invention and identified by reference numeral 61. In this embodiment front end mirror 63, rear end mirror 65 and the three curved mirrors 67, 69 and 71 which make the beam path extender 73 are arranged in a ring cavity type configuration and the active laser element 75 is disposed as shown between the two end mirrors 63 and 65. Mirror 63 is curved but may be flat. Mirror 65 is flat but may be curved. Mirror 63 is fully reflective but may be made partially transmissive. Mirrors 67, 69 and 71 are mounted, sized and positioned in the same way as mirrors 25, 27 and 29 and the operation of optical path extender 73 is the same as optical path extender 23 extender. It should be noted that the invention is not limited to the two cavity configurations shown but is equally applicable to other cavity configurations, such as a cavity comprising a pair of roof prisms and a beam splitter as shown in U.S. Pat. No. 3,508,166.

The embodiment of the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:
1. A laser comprising:
   (a) a plurality of mirrors arranged to define a laser cavity having an adjustable optical path length.
   (b) an active element disposed within the laser cavity, and
   (c) means for pumping the active element to emit radiation,
   (d) the plurality of mirrors comprising a pair of end mirrors which are fixed relative to each other and a set of three intermediate mirrors, the set of three intermediate mirrors comprising first, second and third curved mirrors all having the same radius of curvature RC, the first and second curved mirrors being spaced from each other by a distance equal to RC and the second and third curved mirrors being spaced from each other by a distance equal to RC, the first, second and third curved mirrors being angularly oriented relative to each other such that radiation will be reflected back and forth in succession between the first, second and third curved mirrors a number of times, the number of times the radiation is reflected back and forth in succession between the first, second and third curved mirrors depending on the particular angular position of the first and third curved mirrors, the first curved mirror being rotatably mounted so that its angular position as a result the optical path length of the laser cavity can be selectively changed.

2. The laser of claim 1 and wherein the set of three intermediate mirrors is disposed between the two end mirrors as part of a ring cavity design.

3. The laser of claim 1 and further including a mode locking dye cell disposed within the laser cavity.

4. The laser of claim 1 and wherein one of the end mirrors is partially transmissive to allow radiation to exit the laser cavity.

5. The laser of claim 1 and wherein the active element is neodymium doped silicate glass.

6. A laser comprising:
(a) a laser cavity having an adjustable optical path length,
(b) an active element disposed within the laser cavity, and
(c) means for pumping the active element to emit radiation,
(d) the laser cavity comprising a first end mirror, a second end mirror, a first intermediate mirror, a second intermediate mirror and a third intermediate mirror, said first and second end mirrors being fixed relative to each other, one of said end mirrors being partially transmissive to allow radiation to exit the laser cavity, said first, second and third intermediate mirrors all being curved and having the same radius of curvature RC, the first and second intermediate mirrors being spaced from each other by a distance equal to RC and the second and third intermediate mirrors being spaced from each other by a distance equal to RC, the first, second and third intermediate mirrors being angularly oriented relative to each other such that radiation will be reflected back and forth in succession between the first, second and third intermediate mirrors a number of times, the number of times depending on the particular angular position of the first and third intermediate mirrors, the first intermediate mirror being rotatably mounted so that the number of times the radiation is reflected back and forth between said first, second and third intermediate mirrors can be selectively changed.

7. The laser of claim 6 and wherein the mirrors defining the laser cavity are arranged in a ring cavity design.

8. The laser of claim 7 and further including a saturable absorber disposed within the laser cavity for mode locking purposes.

9. In a laser which generates a stream of pulses of light and which includes a laser cavity, the improvement wherein the laser cavity comprises a pair of end mirrors and a set of three intermediate mirrors, one of said end mirrors being partially transmissive the set of three intermediate mirrors serving to selectively change the spacing between pulses and comprising first, second and third intermediate mirrors all being curved and having the same radius of curvature RC, the first and second intermediate mirrors being spaced from each other by a distance equal to RC and the second and third intermediate mirrors being spaced from each other by a distance equal to RC, the first, second and third intermediate mirrors being angularly oriented relative to each other such that radiation will be reflected back and forth in succession between the first, second and third intermediate mirrors a number of times, the spacing between pulses depending on the number of times, the radiation is reflected back and forth, the number of times the radiation is reflected back and forth depending on the particular angular position of the first and third intermediate mirrors, the first intermediate mirror being rotatably mounted so that the number of times the radiation is reflected back and forth between said first, second and third intermediate mirrors can be selectively changed.

* * * * *